US008534833B2

(12) United States Patent
Cado et al.

(10) Patent No.: US 8,534,833 B2
(45) Date of Patent: Sep. 17, 2013

(54) OPTICAL ARTICLE COMPRISING AN ANTIREFLECTIVE COATING WITH A LOW REFLECTION BOTH IN THE ULTRAVIOLET REGION AND IN THE VISIBLE REGION

(71) Applicants: Herve Cado, Charenton-le-Pont (FR); Francisco De Ayguavives, Charenton-le-Pont (FR); Olivier Pophillat, Charenton-le-Pont (FR)

(72) Inventors: Herve Cado, Charenton-le-Pont (FR); Francisco De Ayguavives, Charenton-le-Pont (FR); Olivier Pophillat, Charenton-le-Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 0 days.

(21) Appl. No.: 13/764,232

(22) Filed: Feb. 11, 2013

(65) Prior Publication Data
US 2013/0155373 A1 Jun. 20, 2013

Related U.S. Application Data

(63) Continuation of application No. 13/643,272, filed as application No. PCT/EP2011/072386 on Dec. 9, 2011.

(60) Provisional application No. 61/421,956, filed on Dec. 10, 2010, provisional application No. 61/541,724, filed on Sep. 30, 2011.

(51) Int. Cl.
*G02C 7/10* (2006.01)

(52) U.S. Cl.
USPC ...................................... 351/159.62

(58) Field of Classification Search
USPC ................. 351/159.6–159.65; 359/601–614, 359/722, 885–892
See application file for complete search history.

(56) References Cited

U.S. PATENT DOCUMENTS

| 4,852,974 | A | 8/1989 | Melzig et al. ................. 359/580 |
| 6,250,758 | B1 * | 6/2001 | Yoshihara et al. ....... 351/159.63 |
| 6,863,397 | B2 * | 3/2005 | Nakano ...................... 351/159.6 |
| 2003/0179343 | A1 * | 9/2003 | Marechal et al. ............. 351/159 |

FOREIGN PATENT DOCUMENTS

| EP | 1 174 734 | 1/2002 |
| FR | 2 943 798 | 10/2010 |
| WO | WO 97/28467 | 8/1997 |
| WO | WO 2010/125667 | 11/2010 |

OTHER PUBLICATIONS

Citek, K. *Optometry*. 79: 143-148, 2008.

* cited by examiner

*Primary Examiner* — Darryl J Collins
(74) *Attorney, Agent, or Firm* — Fulbright & Jaworski LLP

(57) ABSTRACT

This invention relates to an ophthalmic lens with a low reflection both in the ultraviolet region and in the visible region, comprising a substrate provided on its rear main face with a multilayered antireflective coating (3-7 layers) comprising a stack of at least one layer with a high refractive index and at least one layer with a low refractive index, having a mean reflection factor on the rear face in the visible region $R_m$ lower than or equal to 1.15%, a mean light reflection factor on the rear face in the visible region $R_v$ lower than or equal to 1%, a mean reflection factor $R_{UV}$ on the rear face between 280 nm and 380 nm, weighted by the function $W(\lambda)$ defined in the ISO 13666:1998 standard, lower than 5%, for angles of incidence of 30° and 45°, the antireflective coating outer layer being a silica-based layer. The lens according to the invention does especially prevent the reflection of the UV radiation produced by light sources located behind the wearer.

27 Claims, 4 Drawing Sheets

OPTICAL ARTICLE COMPRISING AN ANTIREFLECTIVE COATING WITH A LOW REFLECTION BOTH IN THE ULTRAVIOLET REGION AND IN THE VISIBLE REGION

CROSS REFERENCE TO RELATED APPLICATIONS

This application is a continuation of U.S. patent application Ser. No. 13/643,272 filed Oct. 24, 2012, which is a national phase application under 35 U.S.C. §371 of International Application No. PCT/EP2011/072386 filed Dec. 9, 2011, which claims priority to French Application No. 1060394 filed Dec. 10, 2010, U.S. Provisional Application No. 61/421,956 filed Dec. 10, 2010, and U.S. Provisional Application No. 61/541,724 filed Sep. 30, 2011. The entire contents of each of the above-referenced applications is specifically incorporated herein by reference without disclaimer.

BACKGROUND OF THE INVENTION

1. Field of the Invention

The present invention relates to an optical article comprising on its rear face, and optionally on its front face, an antireflective coating which strongly reduce reflection in the UVA- and UVB-radiation range, and in the visible region. The optical article may especially be an ophthalmic lens, especially a tinted solar lens.

2. Description of Related Art

The solar spectrum comprises electromagnetic radiations having various wavelengths, especially ultraviolet radiation (UV). The UV spectrum has many bands, especially UVA, UVB and UVC bands. Amongst those UV bands which do reach the earth surface, UVA band, ranging from 315 nm to 380, and UVB band, ranging from 280 nm to 315 nm, are particularly harmful to the retina.

Traditional antireflective coatings are designed and optimized to reduce reflection on the lens surface in the visible region, typically within the spectrum range of from 380 to 780 nm. As a rule, the reflection in the ultraviolet region (280-380 nm) is not optimized, and is frequently reinforced by the traditional antireflective coating itself. The article "Anti-reflective coatings reflect ultraviolet radiation", Citek, K. *Optometry* 2008, 79, 143-148 underlines this phenomenon.

The mean reflection in the UVA and UVB regions may thus attain high levels (up to 60%) for traditional antireflective lenses. For example, as regards non-solar antireflective articles which are marketed by most of the manufacturers over the course of these recent years, the UV mean reflection does range from 10 to 25%, for an angle of incidence of from 30 to 45°. It is not problematic on the front face of the lens, since the major part of the UV radiation which comes from the front of the wearer and might attain the wearer's eye (normal incidence, 0 to 15°) generally get absorbed by the ophthalmic lens substrate. A better protection against UV radiation transmission may be obtained through solar ophthalmic lenses, which are studied and designed to reduce the visible spectrum luminosity, totally absorb UVB and totally or partially absorb UVA.

On the other hand, the UV radiation resulting from light sources located behind the wearer may reflect on the lens rear face and reach the wearer's eye if the lens is not provided with an antireflective coating which is efficient in the ultraviolet region, thus potentially affecting the wearer's health. Such phenomenon is made stronger by the trend for fashion sunglasses with high diameters which increase the risk of stray reflections getting into the eyes.

It is admitted that the light rays that may reflect onto the lens rear face and reach the wearer's eye have a narrow incidence angle range, ranging from 30 to 45° (oblique incidence).

There is currently no standard relating to the UV radiation reflection from the rear face.

There are a number of patents dealing with methods for making antireflective coatings that would be efficient in the ultraviolet region, would transmit and/or absorb the UV radiation rather than reflect it. However, optimizing the antireflective performances over the whole ultraviolet region reveals generally detrimental to the antireflective performances in the visible region. Conversely, optimizing only the antireflective performances in the visible region does not make sure that satisfactory antireflective properties can be obtained in the ultraviolet region.

The application EP 1 174 734 discloses a spectacle lens comprising on its rear face a multilayered antireflective coating designed in such a way that the reflection on the antireflective coating surface be lower as compared to the one on the bare optical article surface within the 280-700 nm wavelength range. The function of this antireflective coating consists in minimizing the reflection of the UV radiation originating from behind the wearer or reflected by the wearer's face, on the lens rear face, so as to prevent the same from reaching the wearer's eye.

The antireflective coatings described in this application are very efficient in the ultraviolet region. However, it would be advisable to improve their mean reflection factors in the visible region. Moreover, the conceived stacks are sometimes relatively sophisticated, as they may have up to 10 layers.

The more numerous the number of layers, the easier the production of an efficient antireflective coating within a broad wavelength range. However, making such complicated antireflective coatings is not so interesting from the economical point of view, since it requires a higher amount of materials and makes the industrial process last longer.

The application WO 97/28467 discloses a transparent photochromic article comprising a photochromic substrate coated with a tetra-layer-antireflective stack HI/LI/HI/LI, where HI refers to a layer with a high refractive index and LI to a layer with a low refractive index. Such coating is designed so as not to interfere with the behavior of the photochromic compounds that are present in or onto the substrate, by minimizing the reflection between 350 and 400 nm, which is the wavelength range enabling their activation. The thus prepared antireflective coatings are efficient in the UVA region, but this property is accompanied with a significant decrease in the antireflective performances in the visible region.

The patent U.S. Pat. No. 4,852,974 discloses an optical article comprising a photochromic substrate and a multilayered antireflective coating, having a mean reflection factor between 290 nm and 330 nm higher than 15% and a mean reflection factor between 330 nm and 380 nm that is lower than 4% for an angle of incidence that was not communicated. Such antireflective coating makes it possible to extend the life-time of the photochromic compounds contained in the substrate, but is relatively inefficient within a range where the UV radiation relative efficiency is the highest (290-300 nm). Moreover, it would be desirable to improve its performances in the visible region.

The application WO 2010/125 667 discloses a spectacle lens provided on its rear face with an antireflective coating enabling to reduce the reflection on the lens rear face of the UV radiation originating from behind the wearer, so that it cannot reach his eye.

SUMMARY OF THE INVENTION

It is therefore an object of the present invention to provide a transparent optical article, especially an ophthalmic lens, comprising a substrate in mineral or organic glass comprising on its rear face an anti-UV, antireflective coating possessing very good antireflective performances in the visible region, and which is at the same time capable of significantly reducing the UV radiation reflection, especially ultraviolet A- and ultraviolet B-rays, as compared to a bare substrate or to a substrate comprising a traditional antireflective coating, and which production is easy at industrial scale.

The present invention provides an antireflective coating with an improved conception, comprising a stack made of thin layers, the thicknesses and materials of which have been selected so as to obtain satisfactory antireflective performances both in the visible region and in the ultraviolet region.

The ultraviolet solar radiation distribution is tempered by the relative spectral efficiency of the UV solar radiation, which is nil or almost nil in the range of from 280 to 295 nm (which belongs to the ultraviolet B-ray region). The present invention provides an antireflective coating with lower antireflection performances within this wavelength region, thus allowing to obtain an antireflective coating that is very efficient in the visible region and in the part of the ultraviolet range where the solar radiation distribution tempered by the relative spectral efficiency of such radiation is high for the wearer (300-320 nm). The antireflective coatings according to the invention thus tolerate a higher spectral reflection in the 280 to 295 nm region, with no consequence on the wearer.

The invention therefore relates to an optical article, preferably an ophthalmic lens, comprising a substrate with a front main face and with a rear main face, said rear main face being coated with a multilayered antireflective coating comprising a stack of at least one layer having a refractive index higher than 1.6 and at least one layer having a refractive index lower than 1.5, such that:

the mean reflection factor on said rear face in the visible region $R_m$ is lower than or equal to 1.15%, the mean light reflection factor on said rear face in the visible region $R_v$ is lower than or equal to 1%, the mean reflection factor $R_{UV}$ on said rear face between 280 nm and 380 nm, weighted by the function $W(\lambda)$ defined in the ISO 13666:1998 standard, is lower than 5%, for an angle of incidence of 30° and for an angle of incidence of 45°, the multilayered antireflective coating comprises a number of layers higher than or equal to 3 and lower than or equal to 7, preferably lower than or equal to 6, more preferably lower than or equal to 5, the multilayered antireflective coating does not comprise any electrically conductive layer with a thickness higher than or equal to 20 nm based on indium oxide, the antireflective coating outer layer is a silica-based layer.

BRIEF DESCRIPTION OF THE DRAWINGS

The present invention will be described in more detail by referring to the appended drawings, wherein.

DETAILED DESCRIPTION

Figure 1:
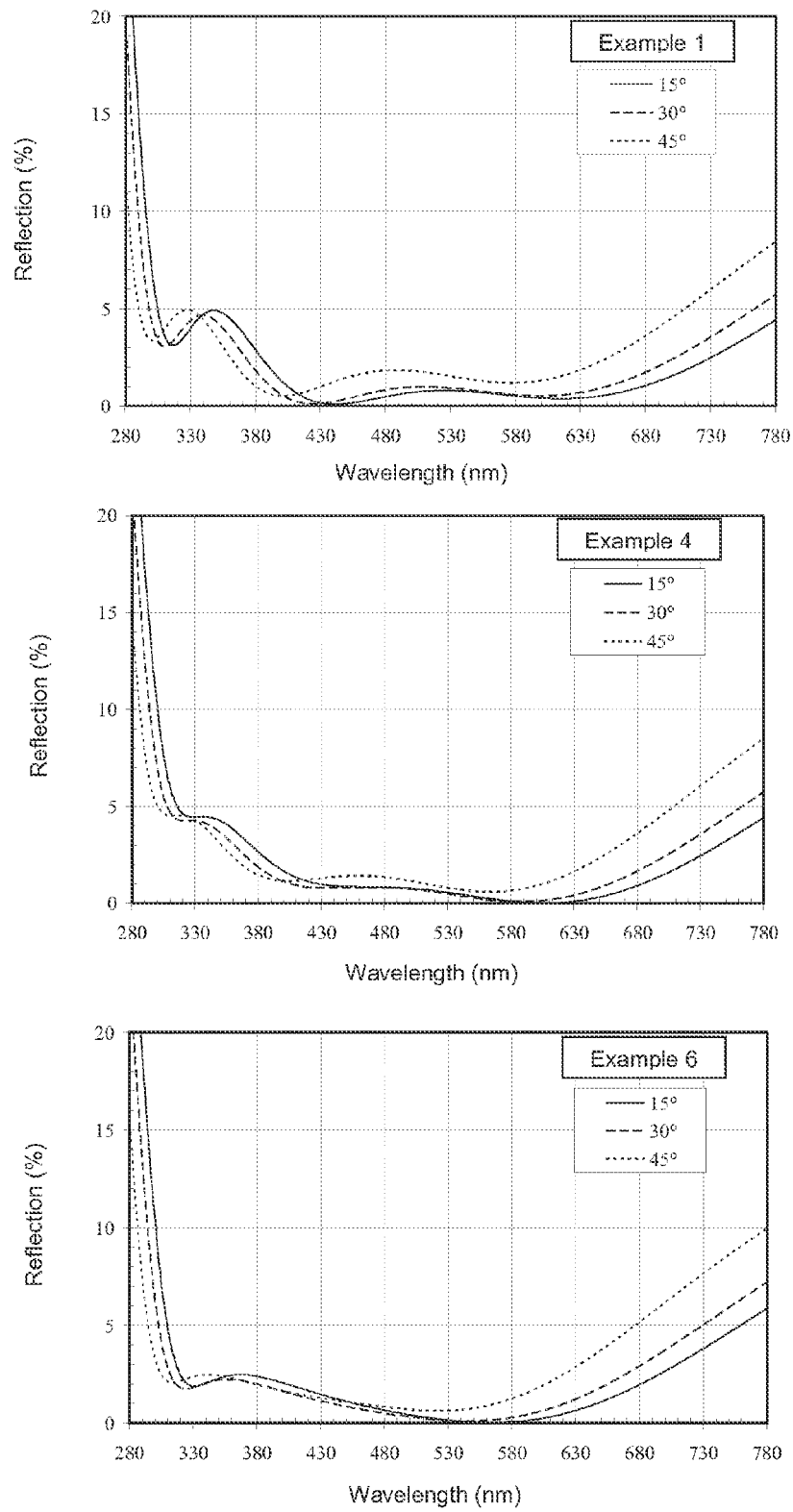
FIGS. 1 to 4 show the variation as a function of the reflection wavelength on the surface of the rear face of some lenses prepared in the examples of the present application, for an angle of incidence of 15°, 30° and 45°.

In the present application, when an optical article comprises one or more coatings onto the surface thereof, the expression "to deposit a layer or a coating onto the article" is intended to mean that a layer or a coating is deposited onto the external (exposed) surface of the outer coating of the article, that is to say its coating that is the most distant from the substrate.

A coating, that is said to be "on" a substrate or deposited "onto" a substrate is defined as a coating, which (i) is positioned above the substrate, (ii) is not necessarily in contact with the substrate, that is to say one or more intermediate coatings may be arranged between the substrate and the coating in question, and (iii) does not necessarily completely cover the substrate.

In a preferred embodiment, the coating on a substrate or deposited onto a substrate is in direct contact with this substrate.

When "a layer 1 is lying under a layer 2", it is intended to mean that layer 2 is more distant from the substrate than layer 1.

As used herein, the rear (or the inner) face of the substrate is intended to mean the face which, when using the article, is the nearest from the wearer's eye. It is generally a concave face. On the contrary, the front face of the substrate, is the face which, when using the article, is the most distant from the wearer's eye. It is generally a convex face.

Generally speaking, the antireflective coating of the optical article according to the invention, which will be called the "anti-UV, antireflective coating", may be deposited onto any substrate, and preferably onto organic lens substrates, for example a thermoplastic or thermosetting plastic material.

Thermoplastic materials to be suitably used for the substrates include (meth)acrylic (co)polymers, especially methyl poly(methacrylate) (PMMA), thio(meth)acrylic (co)polymers, polyvinylbutyral (PVB), polycarbonates (PC), polyurethanes (PU), poly(thiourethanes), polyol allylcarbonate (co)polymers, thermoplastic copolymers of ethylene/vinyl acetate, polyesters such as polyethylene terephthalate (PET) or polybutylene terephthalate (PBT), polyepisulfides, polyepoxides, polycarbonate/polyester copolymers, cycloolefin copolymers such as copolymers of ethylene/norbornene or ethylene/cyclopentadiene, and combinations thereof.

As used herein, a (co)polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

Particularly recommended substrates include those substrates obtained through (co)polymerization of the diethyleneglycol bis-allyl-carbonate, marketed, for example, under the trade name CR-39® by the PPG Industries company (ORMA® lenses, ESSILOR), or through polymerization of the thio(meth)acrylate monomers, such as those described in the application of the French patent FR 2 734 827. The substrates may be obtained through polymerization of the above monomer combinations, or may further comprise mixtures of such polymers and (co)polymers.

Prior to depositing the antireflective coating onto the optionally coated substrate, for example with an abrasion-resistant layer and/or a scratch-resistant coating or with a sub-layer, the surface of said optionally coated substrate is usually submitted to a physical or chemical surface activating treatment, so as to reinforce the adhesion of the antireflective coating. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent).

In the present application, the "mean reflection factor," noted $R_m$, is such as defined in the ISO 13666:1998 Standard, and measured in accordance with the ISO 8980-4 Standard (for an angle of incidence lower than 17°, typically of 15°) i.e. this is the (non weighted) spectral reflection average over the whole visible spectrum between 400 and 700 nm.

The "mean light reflection factor," noted $R_v$, is such as defined in the ISO 13666:1998 Standard, and measured in accordance with the ISO 8980-4 Standard (for an angle of incidence lower than 17°, typically of 15°) i.e. this is the weighted spectral reflection average over the whole visible spectrum between 380 and 780 nm.

The mean reflection factor between 290 and 330 nm, noted $R_{m-UV1}$ can be defined by analogy, which corresponds to the mean spectral reflection between 290 and 330 nm. According to the invention, this factor may be measured at an angle of incidence that may range from 30 to 45°. Similarly, the mean reflection factors in the UVA and UVB ranges, noted $R_{m-UVA}$ and $R_{m-UVB}$, are defined, the sum of which corresponds to the mean reflection factor in the ultraviolet region (280-380 nm), noted $R_{m-UV}$.

Lastly, the mean reflection factor between 280 nm and 380 nm, weighted by the $W(\lambda)$ function defined according to the ISO 13666:1998 Standard and noted $R_{UV}$, may be defined through the following relation:

$$R_{UV} = \frac{\int_{280}^{380} W(\lambda) \cdot R(\lambda) \cdot d\lambda}{\int_{280}^{380} W(\lambda) \cdot d\lambda}$$

wherein $R(\lambda)$ represents the lens spectral reflection factor at a given wavelength, and $W(\lambda)$ represents a weighting function equal to the product of the solar spectrum irradiance $Es(\lambda)$ and the efficiency relative spectral function $S(\lambda)$.

The spectral function $W(\lambda)$, enabling to calculate the ultraviolet radiation transmission factors, is defined according to the ISO 13666:1998 Standard. It makes it possible to express the ultraviolet solar radiation distribution tempered by the relative spectral efficiency of such radiation for the wearer, since it simultaneously takes both the solar spectral energy $Es(\lambda)$ into account, which does globally emit less UVB-rays as compared to UVA-rays, and the spectral efficiency $S(\lambda)$, UVB-rays being more harmful than UVA-rays. The values for those three functions in the ultraviolet region are given in the following table:

| Wavelength λ (nm) | Solar spectrum irradiance $Es(\lambda)$ (mW/m² · nm) | Efficiency relative spectral function $S(\lambda)$ | Weighting function $W(\lambda) = Es(\lambda) \cdot S(\lambda)$ |
|---|---|---|---|
| 280 | 0 | 0.88 | 0 |
| 285 | 0 | 0.77 | 0 |
| 290 | 0 | 0.64 | 0 |
| 295 | $2.09 \times 10^{-4}$ | 0.54 | 0.00011 |
| 300 | $8.10 \times 10^{-2}$ | 0.30 | 0.0243 |
| 305 | 1.91 | 0.060 | 0.115 |
| 310 | 11.0 | 0.015 | 0.165 |
| 315 | 30.0 | 0.003 | 0.09 |
| 320 | 54.0 | 0.0010 | 0.054 |
| 325 | 79.2 | 0.00050 | 0.04 |
| 330 | 101 | 0.00041 | 0.041 |
| 335 | 128 | 0.00034 | 0.044 |
| 340 | 151 | 0.00028 | 0.042 |
| 345 | 170 | 0.00024 | 0.041 |
| 350 | 188 | 0.00020 | 0.038 |
| 355 | 210 | 0.00016 | 0.034 |
| 360 | 233 | 0.00013 | 0.03 |
| 365 | 253 | 0.00011 | 0.028 |
| 370 | 279 | 0.000093 | 0.026 |
| 375 | 306 | 0.000077 | 0.024 |
| 380 | 336 | 0.000064 | 0.022 |

It should be noted that the weighting function $W(\lambda)$ is nil or almost nil between 280 nm and 295 nm, which means that the weighted mean reflection factor is also nil within this wavelength range. This means that even if the reflection level is high over this spectral range, there will be no consequence on the weighted mean reflection factor value $R_{UV}$ calculated between 280 and 380 nm.

According to the present invention, the antireflective coating deposited onto the rear face of the substrate is such that:
the mean reflection factor $R_{UV}$ on said rear face between 280 nm and 380 nm, weighted by the function $W(\lambda)$ defined according to the ISO 13666:1998 Standard, is lower than 5%, for an angle of incidence of 30° and for an angle of incidence of 45°. For these angles of incidence, it is preferably lower than or equal to one of the following values: 4.5%, 4%, 3.5%, 3%, 2.5%, 2%, 1.5%.
the mean reflection factor on said rear face in the visible region $R_m$ of the optical article is lower than or equal to 1.15%, preferably ≦1%, more preferably ≦0.75%,
the mean light reflection factor on said rear face in the visible region $R_v$ of the optical article is lower than or equal to 1%, preferably ≦0.90%, more preferably ≦0.85%.

The anti-UV, antireflective coating according to the invention is especially designed to minimize the reflection towards the eye of the ultraviolet radiation having an angle of incidence on the lenses ranging from 30 to 45°, and its preferred characteristics are described hereunder.

Preferably, the mean reflection factor $R_{m-UV1}$ on said rear face between 290 nm and 330 nm is lower than 15%, for an angle of incidence of 15°, preferably lower than 10%.

In a preferred embodiment of the invention, the mean reflection factor is higher than 5%, more preferably higher than 6%, even more preferably higher than 8% over at least 20% of the 280-295 nm wavelength range, for an angle of incidence of 30° and for an angle of incidence of 45°.

In a further preferred embodiment, the mean reflection factor over at least 70%, more preferably at least 80%, and even more preferably over 100% of the 280-295 nm wavelength range for an angle of incidence of 15°, is higher than 10%, preferably higher than 15%.

In another embodiment, the mean reflection factor on the rear face over at least 70%, more preferably at least 80%, and even more preferably over 100% of the 280-290 nm wavelength range for an angle of incidence of 15°, is higher than 10%, preferably higher than 15%.

Within such wavelength range, the weighting function W(λ) is nil or almost nil. In another embodiment, the mean reflection factor is higher than 5%, more preferably higher than 6%, even more preferably higher than 10%, for at least one wavelength in the 280-295 nm range, for an angle of incidence of 30° and for an angle of incidence of 45°.

Since the mean reflection factor is higher in the 280-295 nm wavelength range or in the 280-290 nm wavelength range, the antireflective properties can be improved in another part of the spectral range, namely in the visible range.

Preferably, the mean reflection factor $R_{m\text{-}UV2}$ on said rear face between 300 nm and 320 nm is lower than 4%, more preferably lower than 3%, for an angle of incidence of 15° and/or 30° and/or 45°. This is particularly interesting for the lens wearer, because the weighting function W(λ) defined according to the ISO 13666:1998 Standard is very high within such ultraviolet region wavelength range, and reaches a maximum level at 310 nm.

Preferably, the mean reflection factor $R_{m\text{-}UV3}$ on said rear face between 300 nm and 380 nm is lower than 5%, more preferably lower than 4.5%, for an angle of incidence of 15°.

The person skilled in the art, with its general knowledge is fully capable of choosing he suitable materials and thicknesses for the various layers of the antireflective coating so as to have the different desired parameters $R_{m\text{-}UV1}$, $R_{m\text{-}UV2}$, $R_{m\text{-}UV3}$, $R_{UV}$, $R_m$ and $R_v$.

The multilayered antireflective coating of the invention comprises a stack of at least one layer with a high refractive index and of at least one layer with a low refractive index. More preferably, it comprises at least two layers with a low refractive index (LI) and at least two layers with a high refractive index (HI). It is here a simple stack, since the layer total number in the antireflective coating is higher than or equal to 3, preferably higher than or equal to 4, and lower than or equal to 7, more preferably lower than or equal to 6, even more preferably lower than or equal to 5, and most preferably equal to 5 layers.

As used herein, a layer of the antireflective coating is defined as having a thickness higher than or equal to 1 nm. Thus, any layer having a thickness lower than 1 nm will not be considered when counting the number of layers in the antireflective coating. The sub-layer either is not considered when counting the number of layers of the antireflective coating.

Unless stated otherwise, all thicknesses disclosed in the present application relate to physical thicknesses.

HI layers and BI layers don't need to alternate with each other in the stack, although they also may, according to one embodiment of the invention. Two HI layers (or more) may be deposited onto each other, as well as two LI layers (or more) may be deposited onto each other.

In the present application, a layer of the antireflective coating is said to be a layer with a high refractive index (HI) when its refractive index is higher than 1.6, preferably higher than or equal to 1.65, even more preferably higher than or equal to 1.7, even more preferably higher than or equal to 1.8 and most preferably higher than or equal to 1.9. Said HI layer preferably has a refractive index lower than 2.1. A layer of an antireflective coating is said to be a low refractive index layer (LI) when its refractive index is lower than or equal to 1.50, preferably lower than or equal to 1.48, more preferably lower than or equal to 1.47. Said LI layer preferably has a refractive index higher than 1.1.

Unless otherwise specified, the refractive indexes referred to in the present application are expressed at 25 °C. at a wavelength of 550 nm.

The HI layer is a traditional high refractive index layer, that is well known in the art. It generally comprises one or more metal oxides such as, without limitation, zirconia ($ZrO_2$), titanium dioxide ($TiO_2$), alumina ($Al_2O_3$), tantalum pentoxide ($Ta_2O_5$), neodymium oxide ($Nd_2O_5$), praseodymium oxide ($Pr_2O_3$), praseodymium titanate ($PrTiO_3$), $La_2O_3$, $Nb_2O_5$, $Y_2O_3$. Optionally, the HI layers may further contain silica or other materials with a low refractive index, provided they have a refractive index higher than 1.6 as indicated hereabove. The preferred materials include $TiO_2$, $PrTiO_3$, $ZrO_2$, $Al_2O_3$, $Y_2O_3$ and mixtures thereof.

The LI layer is also well known and may comprise, without limitation, $SiO_2$, or a mixture of silica and alumina, especially silica doped with alumina, the latter contributing to increase the antireflective coating thermal resistance. The LI layer is preferably a layer comprising at least 80% by weight of silica, more preferably at least 90% by weight of silica, relative to the layer total weight, and even more preferably consists in a silica layer. Preferably, the LI layers in the antireflective coating are not $MgF_2$ layers.

Optionally, the LI layers may further contain materials with a high refractive index, provided the refractive index of the resulting layer is lower than or equal to 1.5.

When a LI layer comprising a mixture of $SiO_2$ and $Al_2O_3$ is used, it preferably comprises from 1 to 10%, more preferably from 1 to 8% and even more preferably from 1 to 5% by weight of $Al_2O_3$ relative to the $SiO_2$ +$Al_2O_3$ total weight in such layer.

For example, $SiO_2$ doped with 4% $Al_2O_3$ by weight, or less, or $SiO_2$ doped with 8% $Al_2O_3$ may be employed. $SiO_2$/$Al_2O_3$ mixtures, that are available on the market may be used, such as LIMA® marketed by the Umicore Materials AG company (refractive index n=1.48-1.50 at 550 nm), or L5® marketed by the Merck KGaA company (refractive index n =1.48 at 500 nm).

The antireflective coating outer layer is necessarily a silica-based layer, comprising preferably at least 80% by weight of silica, more preferably at least 90% by weight of silica (for example a silica layer doped with alumina), relative to the layer total weight, and even more preferably consists in a silica layer.

Generally, the HI layers have a physical thickness ranging from 10 to 120 nm, and the LI layers have a physical thickness ranging from 10 to 100 nm.

Generally, the antireflective coating total thickness is lower than 1 micrometer, preferably lower than or equal to 800 nm, more preferably lower than or equal to 500 nm and even more preferably lower than or equal to 250 nm. The antireflective coating total thickness is generally higher than 100 nm, preferably higher than 150 nm.

Preferably, the antireflective coating does not comprise any layer comprising titanium oxide with a thickness higher than 90 nm, preferably higher than 70 nm. When several layers comprising titanium oxide are present in the antireflective coating, their total thickness is preferably lower than 90 nm, more preferably lower than 70 nm. Most preferably, the antireflective coating does not comprise any titanium oxide-containing layer. The titanium oxide-containing layers are indeed sensitive to photodegradation. As used herein, titanium oxide is intended to mean titanium dioxide or a substoichiometric titanium oxide ($TiO_x$, where x<2).

In one embodiment of the present invention, the antireflective coating is deposited onto a sub-layer. It should be noted that such antireflective coating sub-layer does not belong to the antireflective coating.

As used herein, an antireflective coating sub-layer or adhesion layer is intended to mean a relatively thick coating, used in order to improve the mechanical properties such as the abrasion resistance and/or the scratch resistance of said coating and/or so as to reinforce its adhesion to the substrate or to the underlying coating.

Because of its relatively high thickness, the sub-layer does not generally take part to the antireflective optical activity, especially when it has a refractive index close to that of the underlying coating (which is generally the anti-abrasion and anti-scratch coating) or to that of the substrate, if the sub-layer is directly deposited onto the substrate.

The sub-layer should have a thickness that is sufficient for promoting the abrasion resistance of the antireflective coating, but preferably not to such an extent that a light absorption could be caused, which, depending on the sub-layer nature, could significantly reduce the relative transmission factor $\tau_v$. Its thickness is generally lower than 300 nm, more preferably lower than 200 nm, and is generally higher than 90 nm, more preferably higher than 100 nm.

The sub-layer preferably comprises a $SiO_2$-based layer, this layer comprising preferably at least 80% by weight of silica, more preferably at least 90% by weight of silica, relative to the layer total weight, and even more preferably consists in a silica layer. The thickness of such silica-based layer is generally lower than 300 nm, more preferably lower than 200 nm, and is generally higher than 90 nm, more preferably higher than 100 nm.

In another embodiment, this $SiO_2$-based layer is a silica layer doped with alumina, in amounts such as defined hereabove, preferably consists in a silica layer doped with alumina.

In a particular embodiment, the sub-layer consists in a $SiO_2$ layer.

A sub-layer of the monolayer type will be preferably used. However, the sub-layer may be laminated (multilayered), especially when the sub-layer and the underlying coating (or the substrate, if the sub-layer is deposited directly onto the substrate) have a substantially different refractive index. This applies especially when the underlying coating, which is generally an anti-abrasion and/or anti-scratch coating, or the substrate, have a high refractive index, i.a. a refractive index higher than or equal to 1.55, preferably higher than or equal to 1.57.

In this case, the sub-layer may comprise, in addition to a 90-300 nm-thick layer, called the main layer, preferably at most three additional layers, more preferably at most two additional layers, interleaved between the optionally coated substrate and such 90-300 nm-thick layer, which is generally a silica-based layer. These additional layers are preferably thin layers, which function aims at limiting the reflections at the sub-layer/underlying coating interface or sub-layer/substrate interface, as appropriate.

A multilayered sub-layer preferably comprises, in addition to the main layer, a layer with a high refractive index and with a thickness lower than or equal to 80 nm, more preferably lower than or equal to 50 nm and most preferably lower than or equal to 30 nm. Such layer with a high refractive index is directly contacting the substrate with a high refractive index or the underlying coating with a high refractive index, as appropriate. Of course, this embodiment may be used even if the substrate (or the underlying coating) has a refractive index lower than 1.55.

As an alternative, the sub-layer comprises, in addition to the main layer and to the previously mentioned layer with a high refractive index, a layer made of a $SiO_2$-based material (that is to say comprising preferably at least 80% by weight of silica) with a refractive index lower than or equal to 1.55, preferably lower than or equal to 1.52, more preferably lower than or equal to 1.50, and with a thickness lower than or equal to 80 nm, more preferably lower than or equal to 50 nm and even more preferably lower than or equal to 30 nm, onto which is deposited said layer with a high refractive index. Typically, in this instance, the sub-layer comprises, deposited in this order onto the optionally coated substrate, a 25 nm-thick $SiO_2$ layer, a 10 nm-thick $ZrO_2$ or $Ta_2O_5$ layer and thereafter the sub-layer main layer.

The optical article of the invention may be made antistatic, that is to say not to retain and/or develop a substantial static charge, by incorporating at least one electrically conductive layer into the stack present on the surface of the article.

The ability for a glass to evacuate a static charge obtained after rubbing with a piece of cloth or using any other procedure to generate a static charge (charge applied by corona . . . ) may be quantified by measuring the time it takes for said charge to dissipate. Thus, antistatic glasses have a discharge time of about a few hundred milliseconds, preferably 500 ms or less, whereas it is of about several tens of seconds for a static glass. In the present application, discharge times are measured according to the method exposed in the French application FR 2 943 798.

As used herein, an "electrically conductive layer" or an "antistatic layer" is intended to mean a layer which, due to its presence on the surface of a non-antistatic substrate (i.e. having a discharge time higher than 500 ms), enables to have a discharge time of 500 ms or less after a static charge has been applied onto the surface thereof.

The electrically conductive layer may be located on various places in the stack, generally in or in contact with the antireflective coating, provided the anti-reflective properties thereof are not affected. It is preferably located between two layers of the antireflective coating, and/or is adjacent to a layer with a high refractive index of such antireflective coating. Preferably, the electrically conductive layer is located immediately under a layer with a low refractive index of the antireflective coating, most preferably is the penultimate layer of the antireflective coating by being located immediately under the silica-based outer layer of the antireflective coating.

The electrically conductive layer should be thin enough not to alter the transparency of the antireflective coating. The electrically conductive layer is preferably made from an electrically conductive and highly transparent material, generally an optionally doped metal oxide. In this case, the thickness thereof preferably varies from 1 to 15 nm, more preferably from 1 to 10 nm. Preferably, the electrically conductive layer comprises an optionally doped metal oxide, selected from indium, tin, zinc oxides and mixtures thereof. Tin-indium oxide ($In_2O_3$:Sn, tin-doped indium oxide), aluminum-doped zinc oxide (ZnO:Al), indium oxide ($In_2O_3$) and tin oxide ($SnO_2$) are preferred. In a most preferred embodiment, the electrically conductive and optically transparent layer is a tin-indium oxide layer, noted ITO layer or a tin oxide layer.

Generally, the electrically conductive layer contributes, within the stack, but in a limited manner, because of its low thickness, to obtaining antireflective properties and represents a layer with a high refractive index in the antireflective coating. This is the case for those layers made from an electrically conductive and highly transparent material such as ITO layers.

The antireflective coating does not comprise any layer with a thickness higher than or equal to 20 nm, preferably higher than 15 nm, based on indium oxide. When a plurality of indium oxide-based layers are present in the antireflective coating, their total thickness is preferably lower than 20 nm, more preferably lower than 15 nm. As used herein, an indium oxide-based layer is intended to mean a layer comprising at least 50% by weight of indium oxide relative to the layer total weight.

According to a preferred embodiment, the antireflective coating does not comprise any layer with a thickness higher than or equal to 20 nm, preferably higher than 15 nm, comprising indium oxide, tin oxide or zinc oxide. When a plurality of layers comprising indium oxide, tin oxide or zinc oxide are present in the antireflective coating, their total thickness is preferably lower than 20 nm, more preferably lower than 15 nm.

The various layers of the antireflective coating and the optional sub-layer are preferably deposited by chemical vapor deposition, under vacuum, according to any of the following methods: i) by optionally ion-beam assisted, evaporation; ii) by ion-beam sputtering; iii) by cathode sputtering; iv) by plasma-assisted chemical vapor deposition. These various methods are described in the following references "Thin Film Processes" and "Thin Film Processes II," Vossen & Kern, Ed., Academic Press, 1978 and 1991, respectively. A particularly recommended method is the evaporation under vacuum.

Preferably, the deposition of each of the layers of the antireflective coating and of the optional sub-layer is conducted by evaporation under vacuum.

Preferably, the antireflective coating of the invention comprises a first layer or superposition of layers consisting in 1, 2 or 3 layers having a refractive index higher than 1.6 coated with a second layer or superposition of layers consisting in 1 or 2 layers having a refractive index lower than 1.5. Optionally, this second layer or superposition of layers is coated with a third layer or superposition of layers consisting in 1 or 2 layers having a refractive index higher than 1.6, itself coated with a fourth layer or superposition of layers consisting in 1 or 2 layers having a refractive index lower than 1.5.

According to a particularly preferred embodiment, the anti-UV, antireflective coating comprises, starting from the surface of the substrate optionally coated with one or more functional coatings and preferably coated with a 100-200 nm-thick sub-layer, preferably of silica, a layer with a high refractive index with a thickness of from 8 to 25 nm, preferably of from 8 to 20 nm, preferably of zirconia, a layer with a low refractive index with a thickness of from 10 to 35 nm, preferably of from 15 to 25 nm, preferably of silica, a layer with a high refractive index with a thickness of from 75 to 105 nm, preferably of from 75 to 100 nm, more preferably of from 85 to 100 nm, even more preferably of from 90 to 100 nm, preferably of zirconia, optionally an electrically conductive layer with a thickness of from 3 to 10 nm, preferably of from 4 to 8 nm and a layer with a low refractive index with a thickness of from 60 to 95 nm, preferably of from 65 to 90 nm, more preferably of from 70 to 95 nm, preferably of silica.

In another embodiment, the anti-UV, antireflective coating comprises, starting from the surface of the substrate optionally coated with one or more functional coatings and coated preferably with a 100-200 nm-thick sub-layer, preferably of silica, a layer with a high refractive index with a thickness of from 20 to 65 nm, preferably of zirconia, a layer with a low refractive index with a thickness of from 10 to 30 nm, preferably of silica, a layer with a high refractive index with a thickness of from 5 to 75 nm, preferably of zirconia, a layer with a high refractive index with a thickness of from 20 to 75 nm, preferably of titanium, optionally an electrically conductive layer with a thickness of from 3 to 10 nm, preferably of from 4 to 8 nm and a layer with a low refractive index with a thickness of from 60 to 85 nm, preferably of silica.

In a preferred embodiment of the invention, the front face of the optical article of the invention is also coated with a conventional antireflective coating, different from the one provided on its rear face.

In this case, it is possible for the front face of the optical article to be coated with an antireflective coating that is more efficient in the visible region than that of the substrate's rear face. Thus, in a preferred embodiment, the front face of the optical article is coated with an antireflective coating so that the mean reflection factor in the visible region $R_m$ on this front face is lower than 0.8%, more preferably lower than 0.5%. Preferably, the mean light reflection factor $R_v$ on this front face is lower than 0.8%, more preferably lower than 0.5%. Still preferably, the mean reflection factor $R_{UV}$ between 280 nm and 380 nm, weighted by the function $W(\lambda)$ as defined according to the ISO 13666:1998 Standard, is higher on the front face (preferably >5%) than on the rear face of the optical article.

In a preferred embodiment, for the front face (convex) of the optical article, the mean reflection factor $R_{UV}$ between 280 and 380 nm for an angle of incidence of 45° weighted by the function $W(\lambda)$ defined according to the ISO 13666:1998 Standard, is higher than 7%, more preferably higher than 8%, even more preferably higher than 10% and most preferably higher than 12%.

The mean reflection factor $R_{UV}$ between 280 and 380 nm for the front face (convex) of the optical article and for an angle of incidence of 45°, weighted by the function $W(\lambda)$ defined according to the ISO 13666:1998 Standard, may preferably have values higher than 15%, more preferably higher than 20%, even more preferably higher than 30%.

When a coating is used, which on the front face has a mean reflection factor $R_{UV}$ between 280 and 380 nm for an angle of incidence of 45°, weighted by the function $W(\lambda)$ defined according to the ISO 13666:1998 Standard, higher than 5%, and within the hereabove mentioned preferred ranges, it is preferred to combine therewith, on the rear face, the antireflective coating of the invention (such as defined in the appended claims), having in addition the following preferred characteristics:

The mean reflection factor on said rear face is higher than 5%, more preferably higher than 6%, even more preferably higher than 8%, over at least 20% of the 280 to 295 nm wavelength range, for an angle of incidence of 30° and for an angle of incidence of 45°.

In another preferred embodiment, on the rear face, the mean reflection factor, over at least 70%, preferably over at least 80% and even more preferably over 100% of the 280 to 295 nm-wavelength range, for an angle of incidence of 15°, is higher than 10%, preferably higher than 15%.

In still another embodiment, on the rear face, the mean reflection factor, over at least 70%, preferably over at least 80% and even more preferably over 100% of the 280 to 290 nm-wavelength range, for an angle of incidence of 15°, is higher than 10%, preferably higher than 15%.

The antireflective coating of the front face comprises preferably a stack of at least one layer with a high refractive index and of at least one layer with a low refractive index.

It is however possible to apply an anti-UV, antireflective coating such as described in the present application on the front face of the optical article. The anti-UV antireflective coatings of the front face and of the rear face may then be the same or different.

In one embodiment of the present invention, the front face of the optical article is not coated with an anti-UV, antireflective coating according to the invention.

The anti-UV, antireflective coating may be deposited directly onto a bare substrate. In some applications, it is preferred for the main face of the substrate to be coated with one or more functional coatings prior to depositing the antireflective coating of the invention. These functional coatings traditionally used in optics may be, without limitation, an impact-resistant primer layer, an abrasion-resistant coating and/or a scratch-resistant coating, a polarizing coating, a photochromic coating or a tinted coating.

Preferably, the ophthalmic lens does not comprise any photochromic coating and/or does not comprise any photochromic substrate.

Generally, the front and/or rear main face of the substrate onto which an antireflective coating will be deposited is coated with an impact-resistant primer layer, with an anti-abrasion and/or anti-scratch coating, or with an impact-resistant primer layer coated with an anti-abrasion and/or anti-scratch coating.

The anti-UV, antireflective coating of the invention is preferably deposited onto an anti-abrasion and/or anti-scratch coating. The anti-abrasion and/or scratch-resistant coating may be any layer traditionally used as an anti-abrasion and/or anti-scratch coating in the field of ophthalmic lenses.

The anti-abrasion and/or scratch-resistant coatings are preferably hard coatings based on poly(meth)acrylates or silanes, generally comprising one or more mineral fillers intended to increase the hardness and/or the refractive index of the coating once cured.

Hard anti-abrasion and/or scratch-resistant coatings are preferably prepared from compositions comprising at least one alkoxysilane and/or a hydrolyzate thereof, obtained for example through hydrolysis with a hydrochloric acid solution and optionally condensation and/or curing catalysts.

Suitable coatings, that are recommended for the present invention include coatings based on epoxysilane hydrolyzates such as those described in the patents FR 2 702 486 (EP 0 614 957), U.S. Pat. Nos. 4,211,823 and 5,015,523.

A preferred anti-abrasion and/or scratch-resistant coating composition is the one disclosed in the patent FR 2 702 486, in the name of the applicant. It comprises a hydrolyzate of epoxy trialkoxysilane and dialkyl dialkoxysilane, colloidal silica and a catalytic amount of an aluminum-based curing catalyst such as aluminum acetylacetonate, the rest being essentially composed of solvents traditionally used for formulating such compositions. Preferably, the hydrolyzate used is a hydrolyzate of γ-glycidoxypropyltrimethoxysilane (GLYMO) and dimethyldiethoxysilane (DMDES).

The anti-abrasion and/or scratch-resistant coating composition may be deposited onto the main face of the substrate by dip- or spin-coating. It is then cured by a suitable method (preferably using heat or ultraviolet radiation).

The thickness of the anti-abrasion and/or scratch-resistant coating does generally vary from 2 to 10 μm, preferably from 3 to 5 μm.

Prior to depositing the abrasion-resistant coating and/or the scratch-resistant coating, it is possible to apply onto the substrate a primer coating to improve the impact resistance and/or the adhesion of the subsequent layers in the final product. This coating may be any impact-resistant primer layer traditionally used for articles in a transparent polymer material, such as ophthalmic lenses.

Preferred primer compositions include compositions based on thermoplastic polyurethanes, such as those described in the Japanese patents JP 63-141001 and JP 63-87223, poly(meth)acrylic primer compositions, such as those described in the patent U.S. Pat. No. 5,015,523, compositions based on thermosetting polyurethanes, such as those described in the patent EP 0 404 111 and compositions based on poly(meth)acrylic latexes or polyurethane type latexes, such as those described in the patents U.S. Pat. No. 5,316,791 and EP 0 680 492.

Preferred primer compositions are compositions based on polyurethanes and compositions based on latexes, especially polyurethane type latexes optionally containing polyester units.

Commercially available primer compositions to be suitably used in the present invention include compositions such as Witcobond® 232, Witcobond® 234, Witcobond® 240, Witcobond® 242, Neorez® R-962, Neorez® R-972, Neorez® R-986 and Neorez® R-9603.

Combinations of such latexes may also be used in the primer, especially of polyurethane type latexes and poly(meth)acrylic latexes.

Such primer compositions may be deposited onto the article faces by dip- or spin-coating, thereafter be dried at a temperature of at least 70° C. and up to 100° C., preferably of about 90° C., for a time period ranging from 2 minutes to 2 hours, generally of about 15 minutes, to form primer layers having thicknesses, after curing, of from 0.2 to 2.5 μm, preferably of from 0.5 to 1.5 μm.

The optical article according to the invention may also comprise coatings formed on the antireflective coating and capable of modifying the surface properties thereof, such as hydrophobic and/or oleophobic coatings (antifouling top coat). These coatings are preferably deposited onto the outer layer of the antireflective coating. As a rule, their thickness is lower than or equal to 10 nm, does preferably range from 1 to 10 nm, more preferably from 1 to 5 nm.

There are generally coatings of the fluorosilane or fluorosilazane type. They may be obtained by depositing a fluorosilane or fluorosilazane precursor, comprising preferably at least two hydrolyzable groups per molecule. Fluorosilane precursors preferably comprise fluoropolyether moieties and more preferably perfluoropolyether moieties. These fluorosilanes are well known and are described, between others, in the patents U.S. Pat. Nos. 5,081,192, 5,763,061, 6,183,872, 5,739,639, 5,922,787, 6,337,235, 6,277,485 and EP 0 933 377.

A preferred hydrophobic and/or oleophobic coating composition is marketed by Shin-Etsu Chemical under the trade name KP 801 M®. Another preferred hydrophobic and/or oleophobic coating composition is marketed by Daikin Industries under the trade name OPTOOL DSX®. It is a fluorinated resin comprising perfluoropropylene groups.

Instead of the hydrophobic coating, a hydrophilic coating may be used which provides antifog properties, or an antifog precursor coating which provides antifog properties when associated with a surfactant. Examples of such antifog precursor coatings are described in the patent application WO 2011/080472.

Typically, an ophthalmic lens according to the invention comprises a substrate that is successively coated on its rear face with an impact-resistant primer layer, an anti-abrasion and scratch-resistant layer, an anti-UV, antireflective coating according to the invention, and with a hydrophobic and/or oleophobic coating, or with a hydrophilic coating which provides antifog properties, or an antifog precursor coating. The ophthalmic lens according to the invention is preferably an ophthalmic lens for spectacles (spectacle lens), or a blank for ophthalmic lenses. The lens may be a polarized lens, a photochromic lens or a solar lens, which may be tinted, be corrective, or not.

The front face of the substrate of the optical article may be successively coated with an impact-resistant primer layer, an abrasion-resistant layer and/or a scratch-resistant layer, an antireflective coating which may be, or not, an anti-UV, anti-reflective coating according to the invention, and with a hydrophobic and/or oleophobic coating.

In one embodiment, the optical article according to the invention does not absorb in the visible or not much, which means, in the context of the present application, that its transmission factor in the visible range $\tau_v$, also called relative transmission factor in the visible range, is higher than 90%, more preferably higher than 95%, even more preferably higher than 96% and most preferably higher than 97%.

The factor TV should be understood as defined by the international normalized definition (ISO 13666:1998 Standard) and is measured in accordance with the ISO 8980-3 Standard. It is defined in the wavelength range of from 380 to 780 nm.

Preferably, the light absorption of the article coated according to the invention is lower than or equal to 1%.

The colorimetric coefficients of the optical article of the invention in the international colorimetric CIE L*a*b* are calculated between 380 and 780 nm, taking the standard illuminant D 65 and the observer into account (angle of incidence: 15°). It is possible to prepare antireflective coatings, without limitation as regards their hue angle. However, the hue angle h preferably varies from 120 to 150, thus resulting in a coating having a green reflection, and the chroma C* is preferably lower than 15, more preferably lower than 10. It is much more difficult to obtain an antireflective coating which performances have been optimized in the visible region and in the ultraviolet region when the hue angle lies within the 120-150° range (green) relative to the 235-265° range (blue).

In one embodiment, the chroma C* is higher than 9. The inventors observed that in this instance, the ophthalmic lens has a great colorimetric reliability, i.e. the hue angle h and the chroma C* were particularly stable over time.

The following examples illustrate the present invention in a more detailed, but non-limiting manner.

EXAMPLES

1. General Procedures

The optical articles used in the examples comprise an ORMA® lens substrate from ESSILOR, having a 65 mm diameter, a refractive index of 1.50, and a power of −2,00 diopters and a thickness of 1.2 mm, coated on its rear face with the anti-abrasion and scratch-resistant coating (hard coat) disclosed in Example 3 of the patent EP 0 614 957 (refractive index equal to 1.47 and thickness of 3.5 µm), based on a hydrolyzate composed of GLYMO and DMDES, of colloidal silica and aluminum acetylacetonate, and thereafter with an antireflective coating according to the present invention.

Said anti-abrasion and scratch-resistant coating was obtained by depositing and hardening a composition comprising by weight, 224 parts of GLYMO, 80.5 parts of HCl 0.1 N, 120 parts of DMDES, 718 parts of 30% by weight colloidal silica in methanol, 15 parts of aluminum acetylacetonate and 44 parts of ethylcellosolve. The composition also contained 0.1% of surfactant FLUORAD™ FC-430® manufactured by 3M, by weight relative to the composition total weight.

The layers of the antireflective coating were deposited without heating the substrates by evaporation under vacuum (evaporation source: electron gun).

The deposition frame is a Leybold 1104 machine fitted with an electron gun (ESV14 (8 kV)) for evaporating oxides, and provided with an ion gun (Commonwealth Mark II) for the preliminary phase to prepare the surface of the substrate using argon ions (IPC).

The thickness of the layers was controlled by means of a quartz microbalance. The spectral measurements were effected on a variable incidence-spectrophotometer Perkin-Elmer Lambda 850 with an URA accessory (Universal Reflectance Accessory).

2. Test Procedure

The method for making optical articles comprises the step of introducing the substrate, coated on its rear face with the anti-abrasion and scratch-resistant coating, into a vacuum deposition chamber, a step of pumping until a high-vacuum is obtained, a step of activating the surface of the substrate by means of an argon ion beam (anode current: 1 A, anode voltage: 100 V, neutralization current: 130 mA), turning the ion irradiation off, forming the sub-layer on the anti-abrasion and scratch-resistant coating, then subsequently the various layers of the antireflective coating by successive evaporations and at last a ventilation step.

3. Results

Figure 2:
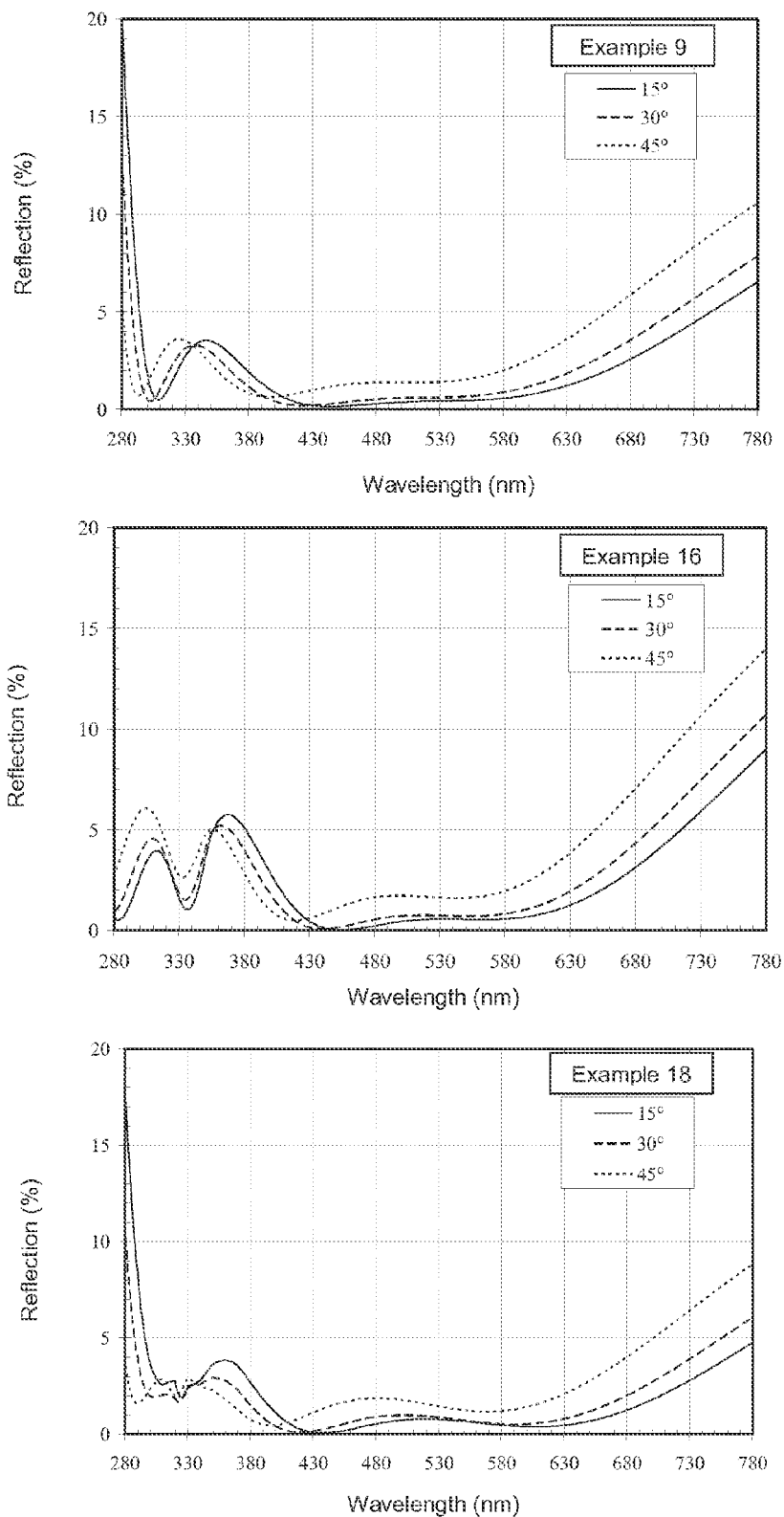
Figure 3:
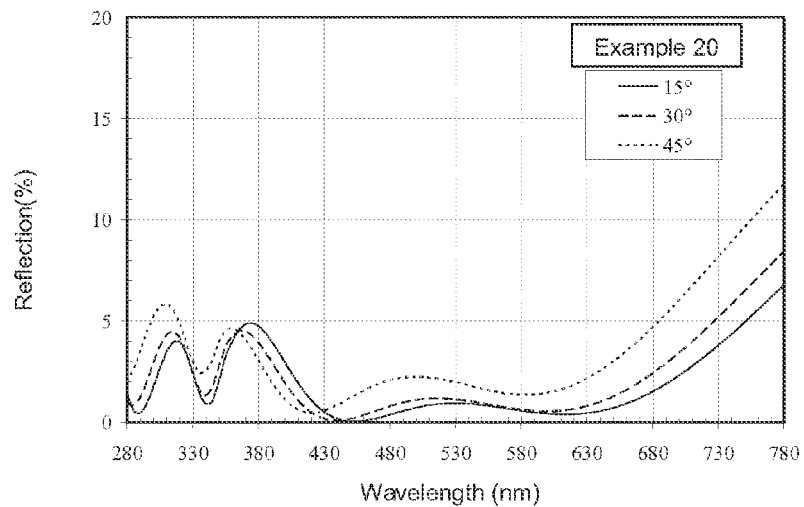
Figure 3:
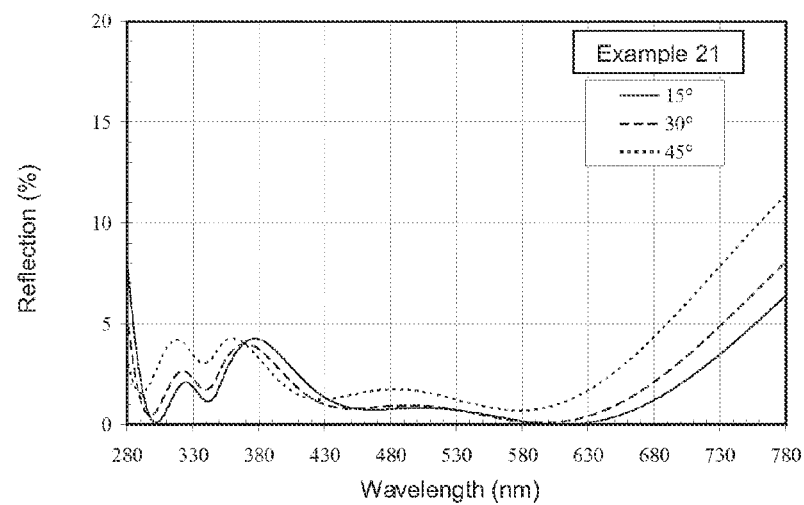
Figure 3:
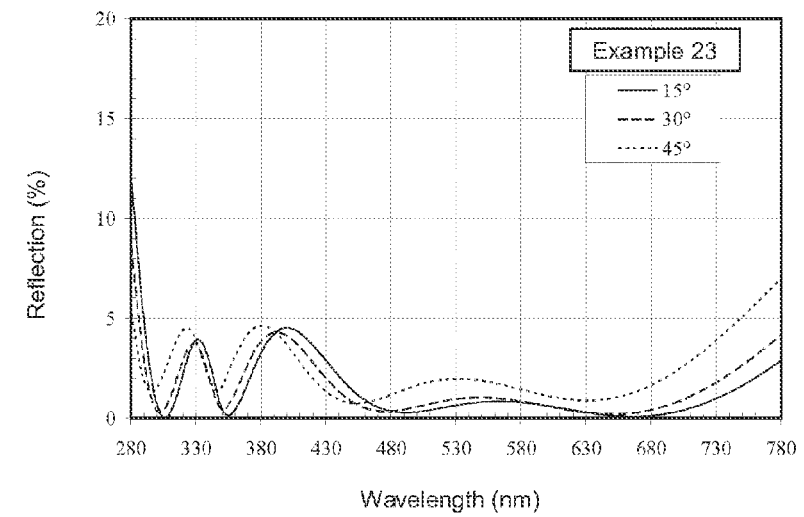
Figure 4:
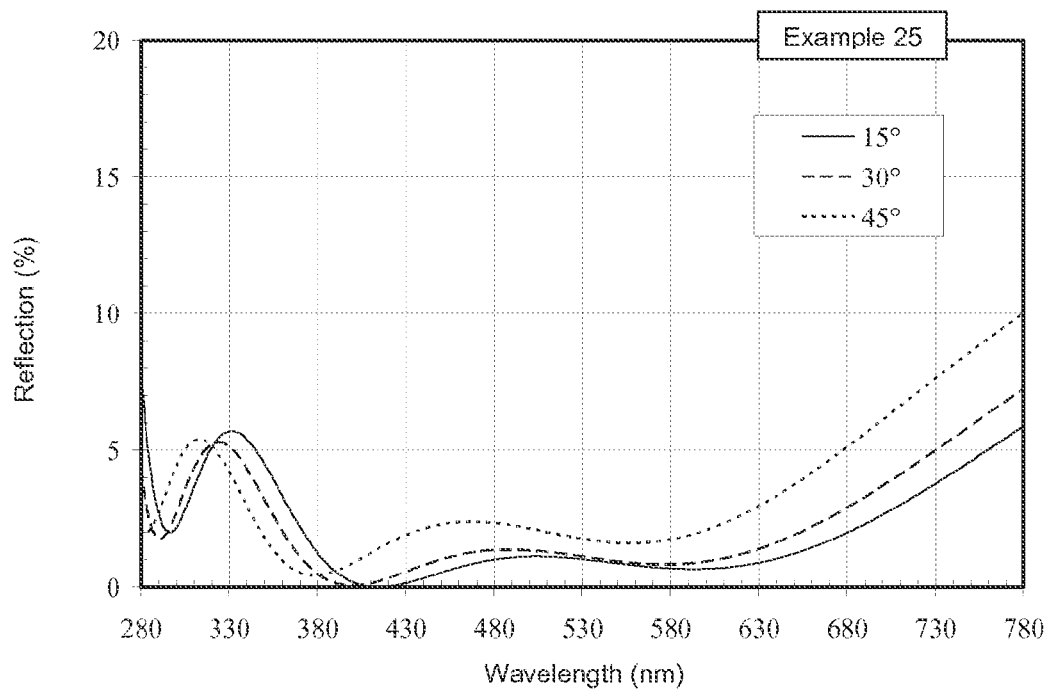

The structural characteristics and the optical performances of the ophthalmic lenses obtained in the Examples 1 to 26 are detailed hereunder. The sub-layer is gray-colored. The reflection graphs between 280 and 780 nm of some articles prepared are illustrated on FIGS. 1-4, with various angles of incidence.

The reflection mean factor values are those of the rear face. Factors $R_m$ and $R_v$ are provided for an angle of incidence of 15°.

| Example 1 Substrate + hard coat | |
|---|---|
| SiO$_2$ | 150 nm |
| ZrO$_2$ | 19 nm |
| SiO$_2$ | 23 nm |
| ZrO$_2$ | 93 nm |
| ITO | 6.5 nm |
| SiO$_2$ | 82 nm |
| Air | |
| $R_{UV}$ (%) | 2.59 (30°) |
|  | 3.10 (45°) |
| h (°) | 135 |
| C* | 7 |
| $R_m$ (%) | 0.58 |
| $R_v$ (%) | 0.59 |

| Example 2 Substrate + hard coat | |
|---|---|
| SiO$_2$ | 150 nm |
| ZrO$_2$ | 17 nm |
| SiO$_2$ | 23 nm |
| ZrO$_2$ | 96 nm |
| ITO | 6.5 nm |
| SiO$_2$ | 75 nm |
| Air | |
| $R_{UV}$ (%) | 1.28 (30°) |
|  | 1.64 (45°) |
| h (°) | 135 |
| C* | 6.9 |
| $R_m$ (%) | 1.02 |
| $R_v$ (%) | 0.85 |

-continued

Example 3
Substrate + hard coat

| Layer | Thickness |
|---|---|
| SiO$_2$ | 150 nm |
| ZrO$_2$ | 13 nm |
| SiO$_2$ | 14 nm |
| ZrO$_2$ | 95 nm |
| ITO | 6.5 nm |
| SiO$_2$ | 76 nm |
| Air | |
| R$_{UV}$ (%) | 3.68 (30°) |
|  | 3.10 (45°) |
| h (°) | 250 |
| C* | 12 |
| R$_m$ (%) | 1.04 |
| R$_v$ (%) | 0.68 |

Example 4
Substrate + hard coat

| Layer | Thickness |
|---|---|
| SiO$_2$ | 150 nm |
| ZrO$_2$ | 14 nm |
| SiO$_2$ | 25 nm |
| ZrO$_2$ | 93 nm |
| ITO | 6.5 nm |
| SiO$_2$ | 88 nm |
| Air | |
| R$_{UV}$ (%) | 4.26 (30°) |
|  | 3.91 (45°) |
| h (°) | 250 |
| C* | 8.5 |
| R$_m$ (%) | 0.62 |
| R$_v$ (%) | 0.40 |

Example 5
Substrate + hard coat

| Layer | Thickness |
|---|---|
| SiO$_2$ | 150 nm |
| ZrO$_2$ | 13 nm |
| SiO$_2$ | 31 nm |
| ZrO$_2$ | 87 nm |
| ITO | 6.5 nm |
| SiO$_2$ | 86 nm |
| Air | |
| R$_{UV}$ (%) | 2.92 (30°) |
|  | 3.15 (45°) |
| h (°) | 300 |
| C* | 12 |
| R$_m$ (%) | 0.73 |
| R$_v$ (%) | 0.23 |

Example 6
Substrate + hard coat

| Layer | Thickness |
|---|---|
| SiO$_2$ | 150 nm |
| ZrO$_2$ | 11 nm |
| SiO$_2$ | 33 nm |
| ZrO$_2$ | 90 nm |
| ITO | 6.5 nm |
| SiO$_2$ | 84 nm |
| Air | |
| R$_{UV}$ (%) | 2.62 (30°) |
|  | 2.30 (45°) |
| h (°) | 300 |
| C* | 15 |
| R$_m$ (%) | 0.84 |
| R$_v$ (%) | 0.26 |

Example 7
Substrate + hard coat

| Layer | Thickness |
|---|---|
| SiO$_2$ | 150 nm |
| ZrO$_2$ | 10 nm |
| SiO$_2$ | 24 nm |
| ZrO$_2$ | 93 nm |
| ITO | 6.5 nm |
| SiO$_2$ | 78 nm |
| Air | |
| R$_{UV}$ (%) | 2.32 (30°) |
|  | 1.90 (45°) |
| h (°) | 300 |
| C* | 12 |
| R$_m$ (%) | 0.98 |
| R$_v$ (%) | 0.40 |

Example 8
Substrate + hard coat

| Layer | Thickness |
|---|---|
| SiO$_2$ | 150 nm |
| ZrO$_2$ | 9 nm |
| SiO$_2$ | 22 nm |
| ZrO$_2$ | 94 nm |
| ITO | 6.5 nm |
| SiO$_2$ | 76 nm |
| Air | |
| R$_{UV}$ (%) | 2.54 (30°) |
|  | 2.00 (45°) |
| h (°) | 300 |
| C* | 15 |
| R$_m$ (%) | 1.13 |
| R$_v$ (%) | 0.45 |

Example 9
Substrate + hard coat

| Layer | Thickness |
|---|---|
| SiO$_2$ | 150 nm |
| ZrO$_2$ | 16 nm |
| SiO$_2$ | 28 nm |
| ZrO$_2$ | 87 nm |
| ITO | 6.5 nm |
| SiO$_2$ | 77 nm |
| Air | |
| R$_{UV}$ (%) | 1.85 (30°) |
|  | 2.53 (45°) |
| h (°) | 45 |
| C* | 7 |
| R$_m$ (%) | 0.87 |
| R$_v$ (%) | 0.55 |

Example 10
Substrate + hard coat

| Layer | Thickness |
|---|---|
| SiO$_2$ | 150 nm |
| ZrO$_2$ | 14 nm |
| SiO$_2$ | 30 nm |
| ZrO$_2$ | 93 nm |
| ITO | 6.5 nm |
| SiO$_2$ | 75 nm |
| Air | |
| R$_{UV}$ (%) | 0.89 (30°) |
|  | 1.35 (45°) |
| h (°) | 45 |
| C* | 7 |
| R$_m$ (%) | 0.96 |
| R$_v$ (%) | 0.65 |

Example 11
Substrate + hard coat

| | |
|---|---|
| $SiO_2$ | 150 nm |
| $ZrO_2$ | 14 nm |
| $SiO_2$ | 32 nm |
| $ZrO_2$ | 93 nm |
| ITO | 6.5 nm |
| $SiO_2$ | 74 nm |
| Air | |
| $R_{UV}$ (%) | 1.31 (30°) |
| | 0.82 (45°) |
| h (°) | 45 |
| C* | 9 |
| $R_m$ (%) | 1.06 |
| $R_v$ (%) | 0.74 |

Example 12
Substrate + hard coat

| | |
|---|---|
| $SiO_2$ | 150 nm |
| $ZrO_2$ | 14 nm |
| $Al_2O_3$ | 33 nm |
| $ZrO_2$ | 87 nm |
| ITO | 6.5 nm |
| $SiO_2$ | 81 nm |
| Air | |
| $R_{UV}$ (%) | 2.72 (30°) |
| | 3.22 (45°) |
| h (°) | 135 |
| C* | 7 |
| $R_m$ (%) | 0.61 |
| $R_v$ (%) | 0.60 |

Example 13
Substrate + hard coat

| | |
|---|---|
| $SiO_2$ | 150 nm |
| $Y_2O_3$ | 39 nm |
| $Al_2O_3$ | 16 nm |
| $ZrO_2$ | 85 nm |
| ITO | 6.5 nm |
| $SiO_2$ | 81 nm |
| Air | |
| $R_{UV}$ (%) | 3.13 (30°) |
| | 3.44 (45°) |
| h (°) | 135 |
| C* | 7 |
| $R_m$ (%) | 0.61 |
| $R_v$ (%) | 0.60 |

Example 14
Substrate + hard coat

| | |
|---|---|
| $SiO_2$ | 150 nm |
| $PrTiO_3$ | 20 nm |
| $SiO_2$ | 21 nm |
| $PrTiO_3$ | 88 nm |
| ITO | 6.5 nm |
| $SiO_2$ | 78 nm |
| Air | |
| $R_{UV}$ (%) | 2.63 (30°) |
| | 3.06 (45°) |
| h (°) | 135 |
| C* | 7 |
| $R_m$ (%) | 0.73 |
| $R_v$ (%) | 0.64 |

Example 15
Substrate + hard coat

| | |
|---|---|
| $SiO_2$ | 150 nm |
| $Y_2O_3$ | 42 nm |
| $SiO_2$ | 10 nm |
| $Y_2O_3$ | 90 nm |
| ITO | 6.5 nm |
| $SiO_2$ | 82 nm |
| Air | |
| $R_{UV}$ (%) | 2.86 (30°) |
| | 3.10 (45°) |
| h (°) | 135 |
| C* | 7 |
| $R_m$ (%) | 0.59 |
| $R_v$ (%) | 0.60 |

Example 16
Substrate + hard coat

| | |
|---|---|
| $SiO_2$ | 150 nm |
| $ZrO_2$ | 35 nm |
| $SiO_2$ | 16 nm |
| $TiO_2$ | 62 nm |
| $ZrO_2$ | 23 nm |
| ITO | 6.5 nm |
| $SiO_2$ | 64 nm |
| Air | |
| $R_{UV}$ (%) | 3.87 (30°) |
| | 4.71 (45°) |
| h (°) | 45 |
| C* | 7 |
| $R_m$ (%) | 1.07 |
| $R_v$ (%) | 0.60 |

Example 17
Substrate + hard coat

| | |
|---|---|
| $SiO_2$ | 150 nm |
| $Al_2O_3$ | 19 nm |
| $ZrO_2$ | 15 nm |
| $SiO_2$ | 20 nm |
| $ZrO_2$ | 91 nm |
| ITO | 6.5 nm |
| $SiO_2$ | 82 nm |
| Air | |
| $R_{UV}$ (%) | 3.15 (30°) |
| | 3.63 (45°) |
| h (°) | 135 |
| C* | 7 |
| $R_m$ (%) | 0.57 |
| $R_v$ (%) | 0.59 |

Example 18
Substrate + hard coat

| | |
|---|---|
| $SiO_2$ | 150 nm |
| $ZrO_2$ | 24 nm |
| $SiO_2$ | 27 nm |
| $TiO_2$ | 9 nm |
| $ZrO_2$ | 69 nm |
| ITO | 6.5 nm |
| $SiO_2$ | 82 nm |
| Air | |
| $R_{UV}$ (%) | 2.23 (30°) |
| | 2.37 (45°) |
| h (°) | 135 |
| C* | 7 |
| $R_m$ (%) | 0.62 |
| $R_v$ (%) | 0.60 |

Example 19
Substrate + hard coat

| Layer | Thickness |
|---|---|
| SiO$_2$ | 150 nm |
| ZrO$_2$ | 26 nm |
| SiO$_2$ | 27 nm |
| TiO$_2$ | 10 nm |
| ZrO$_2$ | 60 nm |
| ITO | 6.5 nm |
| SiO$_2$ | 81 nm |
| Air | |
| R$_{UV}$ (%) | 2.14 (30°) |
| | 2.63 (45°) |
| h (°) | 135 |
| C* | 5.5 |
| R$_m$ (%) | 0.66 |
| R$_v$ (%) | 0.55 |

Example 20
Substrate + hard coat

| Layer | Thickness |
|---|---|
| SiO$_2$ | 150 nm |
| ZrO$_2$ | 40 nm |
| SiO$_2$ | 11 nm |
| TiO$_2$ | 65 nm |
| ZrO$_2$ | 25 nm |
| ITO | 6.5 nm |
| SiO$_2$ | 66 nm |
| Air | |
| R$_{UV}$ (%) | 2.66 (30°) |
| | 4.27 (45°) |
| h (°) | 135 |
| C* | 6.9 |
| R$_m$ (%) | 0.80 |
| R$_v$ (%) | 0.68 |

Example 21
Substrate + hard coat

| Layer | Thickness |
|---|---|
| SiO$_2$ | 150 nm |
| ZrO$_2$ | 33 nm |
| SiO$_2$ | 14 nm |
| TiO$_2$ | 62 nm |
| ZrO$_2$ | 28 nm |
| ITO | 6.5 nm |
| SiO$_2$ | 72 nm |
| Air | |
| R$_{UV}$ (%) | 2.20 (30°) |
| | 3.66 (45°) |
| h (°) | 250 |
| C* | 9 |
| R$_m$ (%) | 0.79 |
| R$_v$ (%) | 0.48 |

Example 22
Substrate + hard coat

| Layer | Thickness |
|---|---|
| SiO$_2$ | 150 nm |
| ZrO$_2$ | 61 nm |
| SiO$_2$ | 29 nm |
| TiO$_2$ | 14 nm |
| ZrO$_2$ | 11 nm |
| ITO | 6.5 nm |
| SiO$_2$ | 72 nm |
| Air | |
| R$_{UV}$ (%) | 2.47 (30°) |
| | 2.29 (45°) |
| h (°) | 250 |
| C* | 9 |
| R$_m$ (%) | 1.05 |
| R$_v$ (%) | 0.59 |

Example 23
Substrate + hard coat

| Layer | Thickness |
|---|---|
| SiO$_2$ | 150 nm |
| ZrO$_2$ | 38 nm |
| SiO$_2$ | 14 nm |
| TiO$_2$ | 70 nm |
| ZrO$_2$ | 30 nm |
| ITO | 6.5 nm |
| SiO$_2$ | 75 nm |
| Air | |
| R$_{UV}$ (%) | 1.71 (30°) |
| | 3.07 (45°) |
| h (°) | 300 |
| C* | 15 |
| R$_m$ (%) | 0.94 |
| R$_v$ (%) | 0.65 |

Example 24
Substrate + hard coat

| Layer | Thickness |
|---|---|
| SiO$_2$ | 150 nm |
| ZrO$_2$ | 29 nm |
| SiO$_2$ | 16 nm |
| TiO$_2$ | 57 nm |
| ZrO$_2$ | 27 nm |
| ITO | 6.5 nm |
| SiO$_2$ | 70 nm |
| Air | |
| R$_{UV}$ (%) | 2.68 (30°) |
| | 4.05 (45°) |
| h (°) | 300 |
| C* | 15 |
| R$_m$ (%) | 1.14 |
| R$_v$ (%) | 0.36 |

Example 25
Substrate + hard coat

| Layer | Thickness |
|---|---|
| SiO$_2$ | 150 nm |
| Y$_2$O$_3$ | 62 nm |
| ZrO$_2$ | 74 nm |
| ITO | 6.5 nm |
| SiO$_2$ | 77 nm |
| Air | |
| R$_{UV}$ (%) | 3.79 (30°) |
| | 3.81 (45°) |
| h (°) | 135 |
| C* | 7 |
| R$_m$ (%) | 0.92 |
| R$_v$ (%) | 0.86 |

Example 26
Substrate + hard coat

| Layer | Thickness |
|---|---|
| SiO$_2$ | 150 nm |
| Y$_2$O$_3$ | 46 nm |
| ZrO$_2$ | 84 nm |
| ITO | 6.5 nm |
| SiO$_2$ | 75 nm |
| Air | |
| R$_{UV}$ (%) | 2.97 (30°) |
| | 2.57 (45°) |
| h (°) | 250 |
| C* | 8.9 |
| R$_m$ (%) | 1.07 |
| R$_v$ (%) | 0.74 |

It could be observed that the optical articles of the invention possess very good antireflective properties in the visible region (Rv<0.86%), with no detrimental influence on the antireflective performances in the ultraviolet region ($R_{UV} \leq 4.26\%$ for an angle of incidence of 30° and $R_{UV} \leq 4.71\%$ for an angle of incidence of 45°). The reflection level in the ultraviolet region of the lenses of the invention remains lower than that of a bare ORMA® substrate, for an angle of incidence of 30° or 45° (see Comparative examples hereunder).

Moreover, the lenses obtained in Examples 1 to 26 have outstanding transparency properties, a good resistance to abrasion and to scratches, and a good resistance to a hot water dip-treatment, followed with a mechanical stress on the surface. The adhesion of the coatings to the substrate was also very satisfactory.

Another example according to the invention is a $ZrO_2$ (18.9 nm)/L5 substance (22.5 nm)/$ZrO_2$ (94.7 nm)/(ITO) 6.5 nm)/L5 substance (77.4 nm) stack. ($R_m$=0.77%; $R_v$=0.80%, $R_{UV}$ (45°)=3.5%).

Comparative Examples

The antireflective performances on the rear face of four lenses provided with an antireflective coating, that are quite popular nowadays on the market, have been determined and are given in the following table:

| Comparative examples | $R_v$ (%) | $R_{UV}$ (%) |
|---|---|---|
| A | 0.78 (30°) | 26.02 (30°) |
|   |            | 19.89 (45°) |
| B | 0.66 (30°) | 10.47 (30°) |
|   |            | 8.25 (45°) |
| C | 0.39 (30°) | 18.15 (30°) |
|   |            | 15.35 (45°) |
| D | 0.56 (30°) | 6.58 (30°) |
|   |            | 5.51 (45°) |
| ORMA® bare substrate | 3.94 (15°) | 4.46 (30°) |
|   | 4.08 (30°) | 5.35 (45°) |

It could be observed that the commercially available antireflective lenses were designed to minimize reflection in the visible region, without being concerned about the reflection in the ultraviolet region, which may reach very high values. Moreover, all the antireflective coatings studied did more strongly reflect the UV radiation coming from behind the wearer (angle of incidence of from 30° to 45°) as compared to a bare lens devoid of any antireflective coating.

The invention claimed is:

1. An ophthalmic lens comprising a substrate with a front main face and a rear main face, the rear main face being coated with a multilayered antireflective coating comprising a stack of at least one layer having a refractive index higher than 1.6 and of at least one layer having a refractive index lower than 1.5 wherein:
   the mean reflection factor on the rear face in the visible region $R_m$ is lower than or equal to 1.15%;
   the mean light reflection factor on the rear face in the visible region $R_v$ is lower than or equal to 1%;
   the mean reflection factor $R_{UV}$ on the rear face between 280 nm and 380 nm, weighted by the function $W(\lambda)$ defined in the ISO 13666:1998 standard, is lower than 5%, for an angle of incidence of 30° and for an angle of incidence of 45°;
   the multilayered antireflective coating comprises at least 3 layers;
   the multilayered antireflective coating does not comprise any layer with a thickness higher than or equal to 20 nm based on indium oxide; and
   the antireflective coating outer layer is a silica-based layer, wherein the mean reflection factor $R_{UV}$ on the rear face between 280 nm and 380 nm, weighted by the function $W(\lambda)$ defined in the ISO 13666:1998 standard, is lower than or equal to 4%, for both an angle of incidence of 30° and an angle of incidence of 45°.

2. The lens of claim 1, wherein the multilayered antireflective coating comprises at least 4 layers.

3. The lens of claim 1, wherein the multilayered antireflective coating comprises 7 or fewer layers.

4. The lens of claim 3, wherein the multilayered antireflective coating comprises 5 or fewer layers.

5. The lens of claim 1, wherein the antireflective coating comprises at least two layers having a refractive index higher than 1.6 and at least two layers having a refractive index lower than 1.5.

6. The lens of claim 1, wherein the antireflective coating is deposited on a silica-based sub-layer layer having a thickness of from 100 to 300 nm.

7. The lens of claim 1, wherein the antireflective coating comprises at least one electrically conductive layer.

8. The lens of claim 1, wherein the mean reflection factor $R_{m-UV1}$ on the rear face between 290 nm and 330 nm is lower than 15%, for an angle of incidence of 15°.

9. The lens of claim 8, wherein the mean reflection factor $R_{m-UV1}$ on the rear face between 290 nm and 330 nm is lower than 10%, for an angle of incidence of 15°.

10. The lens of claim 1, wherein the mean reflection factor $R_{m-UV2}$ on the rear face between 300 nm and 320 nm is lower than 4% for an angle of incidence of 15° and/or 30° and/or 45°.

11. The lens of claim 10, wherein the mean reflection factor $R_{m-UV2}$ on the rear face between 300 nm and 320 nm is lower than 3% for an angle of incidence of 15° and/or 30° and/or 45°.

12. The lens of claim 1, wherein the mean reflection factor $R_{m-UV3}$ on the rear face between 300 nm and 380 nm is lower than 5%, for an angle of incidence of 15°.

13. The lens of claim 1, wherein the mean reflection factor on the rear face in the visible region $R_m$ is lower than or equal to 1%.

14. The lens of claim 13, wherein the mean reflection factor on the rear face in the visible region $R_m$ is lower than or equal to 0.75%.

15. The lens of claim 1, wherein the mean light reflection factor on the rear face in the visible region $R_v$ is lower than or equal to 0.90%.

16. The lens of claim 1, wherein the mean reflection factor $R_{UV}$ on the rear face between 280 nm and 380 nm, weighted by the function $W(\lambda)$ defined in the ISO 13666:1998 standard, is lower than or equal to 3.5.%, for both an angle of incidence of 30° and an angle of incidence of 45°.

17. The lens of claim 1, wherein the multilayered antireflective coating does not comprise any $MgF_2$ layer.

18. The lens of claim 1, further defined as a tinted solar lens.

19. An ophthalmic lens comprising a substrate with a front main face and a rear main face, the rear main face being coated with a multilayered antireflective coating comprising a stack of at least one layer having a refractive index higher than 1.6 and of at least one layer having, a refractive index lower than 1.5 wherein:
   the mean reflection factor on the rear face in the visible region $R_m$ is lower than or equal to 1.15%;
   the mean light reflection factor on the rear face in the visible region $R_v$ is lower than or equal to 1%;

the mean reflection factor $R_{UV}$ on the rear face between 280 nm and 380 nm, weighted by the function W(λ) defined in the ISO 13666:1998 standard, is lower than 5%, for an angle of incidence of 30° and for an angle of incidence of 45°;

the multilayered antireflective coating comprises at least 3 layers;

the multilayered antireflective coating does not comprise any layer with a thickness higher than or equal to 20 nm based on indium oxide; and the antireflective coating outer layer is a silica-based layer wherein the mean spectral reflection factor for at least one wavelength in the 280-295 nm range for both an angle of incidence of 30° and an angle of incidence of 45° is higher than 5%.

20. The lens of claim 19, wherein the mean spectral reflection factor for at least one wavelength in the 280-295 nm range for both an angle of incidence of 30° and an angle of incidence of 45° is higher than 10%.

21. The lens of claim 19, wherein the mean spectral reflection factor over at least 20% of the 280-295 nm wavelength range is higher than 5%, for both an angle of incidence of 30° and an angle of incidence of 45°.

22. The lens of claim 21, wherein the mean spectral reflection factor over at least 20% of the 280-295 nm wavelength range is higher than 6%, for both an angle of incidence of 30° and an angle of incidence of 45°.

23. The lens of claim 19, wherein the multilayered antireflective coating comprises 7 or fewer layers.

24. An ophthalmic lens comprising a substrate with a front main face and a rear main face, the rear main face being coated with a multilayered antireflective coating comprising a stack of at least one layer having a refractive index higher than 1.6 and of at least one layer having a refractive index lower than 1.5 wherein:

the mean reflection factor on the rear face in the visible region $R_m$ is lower than or equal to 1.15%;

the mean light reflection factor on the rear face in the visible region $R_v$ is lower than or equal to 1%;

the mean reflection factor $R_{UV}$ on the rear face between 280 nm and 380 nm, weighted by the function W(λ) defined in the ISO 13666:1998 standard, is lower than 5%, for an angle of incidence of 30° and for an angle of incidence of 45°;

the multilayered antireflective coating comprises at least 3 layers;

the multilayered antireflective coating does not comprise any layer with a thickness higher than or equal to 20 nm based on indium oxide; and the antireflective coating outer layer is a silica-based layer wherein the mean spectral reflection factor over at least 70% of the 280-290 nm wavelength range, for an angle of incidence of 15° is higher than 10%.

25. The lens of claim 24, wherein the multilayered antireflective coating comprises 7 or fewer layers.

26. An ophthalmic lens comprising a substrate with a front main face and a rear main face, the rear main face being coated with a multilayered antireflective coating comprising a stack of at least one layer having a refractive index higher than 1.6 and of at least one layer having a refractive index lower than 1.5 wherein:

the mean reflection factor on the rear face in the visible region $R_m$ is lower than or equal to 1.15%;

the mean light reflection factor on the rear face in the visible region $R_v$ is lower than or equal to 1%;

the mean reflection factor $R_{UV}$ on the rear face between 280 nm and 380 nm, weighted by the function W(λ) defined in the ISO 13666:1998 standard, is lower than 5%, for an angle of incidence of 30° and for an angle of incidence of 45°;

the multilayered antireflective coating comprises at least 3 layers;

the multilayered antireflective coating does not comprise any layer with a thickness higher than or equal to 20 nm based on indium oxide; and the antireflective coating outer layer is a silica-based layer wherein the antireflective coating comprises, in the direction moving away from the substrate, a layer having a refractive index higher than 1.6 with a thickness of from 8 to 25 nm, a layer having a refractive index lower than 1.5 with a thickness of from 10 to 35 nm, a layer having a refractive index higher than 1.6 with a thickness of from 75 to 105 nm, and a layer having a refractive index lower than 1.5, with a thickness of from 70 to 95 nm.

27. The lens of claim 26, wherein the multilayered antireflective coating comprises 7 or fewer layers.

* * * * *

UNITED STATES PATENT AND TRADEMARK OFFICE
CERTIFICATE OF CORRECTION

PATENT NO. : 8,534,833 B2 Page 1 of 1
APPLICATION NO. : 13/764232
DATED : September 17, 2013
INVENTOR(S) : Herve Cado et al.

It is certified that error appears in the above-identified patent and that said Letters Patent is hereby corrected as shown below:

Title Page, Insert:

-- (30) Foreign Application Priority Data
December 10, 2010 (FR) ....................1060394 --

Signed and Sealed this
Twenty-ninth Day of October, 2013

Teresa Stanek Rea
*Deputy Director of the United States Patent and Trademark Office*